United States Patent [19]
Byon

[11] Patent Number: 5,762,972
[45] Date of Patent: Jun. 9, 1998

[54] APPARATUS FOR HEATING A MOLD FOR AN INJECTION MOLDING SYSTEM

[75] Inventor: Sung-Kwang Byon, Seoul, Rep. of Korea

[73] Assignee: Daewoo Electronics Co., Ltd., Seoul, Rep. of Korea

[21] Appl. No.: 620,157

[22] Filed: Mar. 22, 1996

[30] Foreign Application Priority Data

Mar. 22, 1995 [KR] Rep. of Korea .............. 1995-6058

[51] Int. Cl.⁶ ............................................ B29C 45/73
[52] U.S. Cl. .................. 425/144; 264/328.16; 264/402; 264/403; 425/174.4; 425/174.8 R; 425/DIG. 110; 425/DIG. 246
[58] Field of Search ......................... 425/144, 147, 425/174.8 R, 174.8 E, 174.4, DIG. 110, DIG. 246; 264/402, 403, 328.16, 40.6

[56] References Cited

U.S. PATENT DOCUMENTS

| | | | |
|---|---|---|---|
| 2,569,919 | 10/1951 | Bertrand et al. | 425/174.8 |
| 2,581,939 | 1/1952 | Deist et al. | 425/174.8 |
| 4,198,554 | 4/1980 | Wayne | 264/402 |
| 4,298,324 | 11/1981 | Soulier | 425/174.8 |
| 4,481,159 | 11/1984 | Itoh | 264/26 |
| 4,544,339 | 10/1985 | Itoh | 425/174.8 |
| 5,376,317 | 12/1994 | Mause et al. | 264/40.6 |
| 5,411,686 | 5/1995 | Hata | 425/144 |

FOREIGN PATENT DOCUMENTS

94/23922 10/1994 WIPO.

*Primary Examiner*—Jay H. Woo
*Assistant Examiner*—Iurie A. Schwartz

[57] ABSTRACT

An apparatus performs induction heating or dielectric heating of a mold for an injection molding system up to a desired temperature within a short time by using high frequencies or microwaves. The electric current of high frequency generated from a high frequency generator flows through a coil embedded in the mold to induction-heat the mold by an induction phenomenon with the mold, and microwaves from a microwave generator heats the dielectric material within the mold, thereby preventing cooling of the mold when a resin fluid is injected into a cavity.

4 Claims, 3 Drawing Sheets

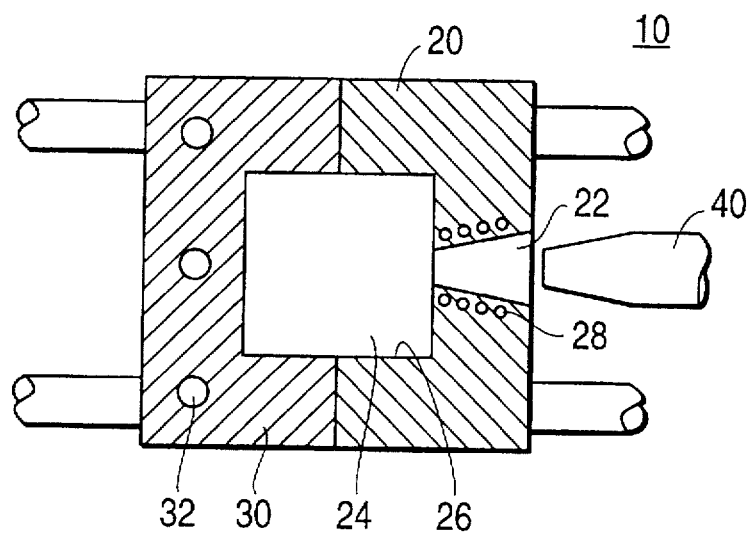
FIG. 1
PRIOR ART
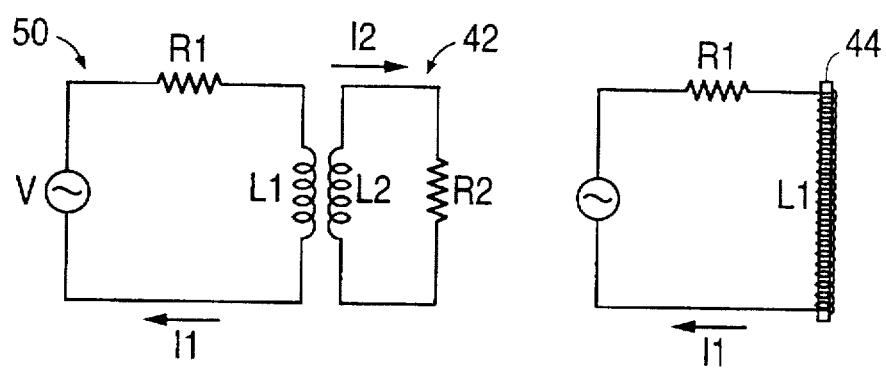
FIG. 2A
PRIOR ART
FIG. 2B
PRIOR ART

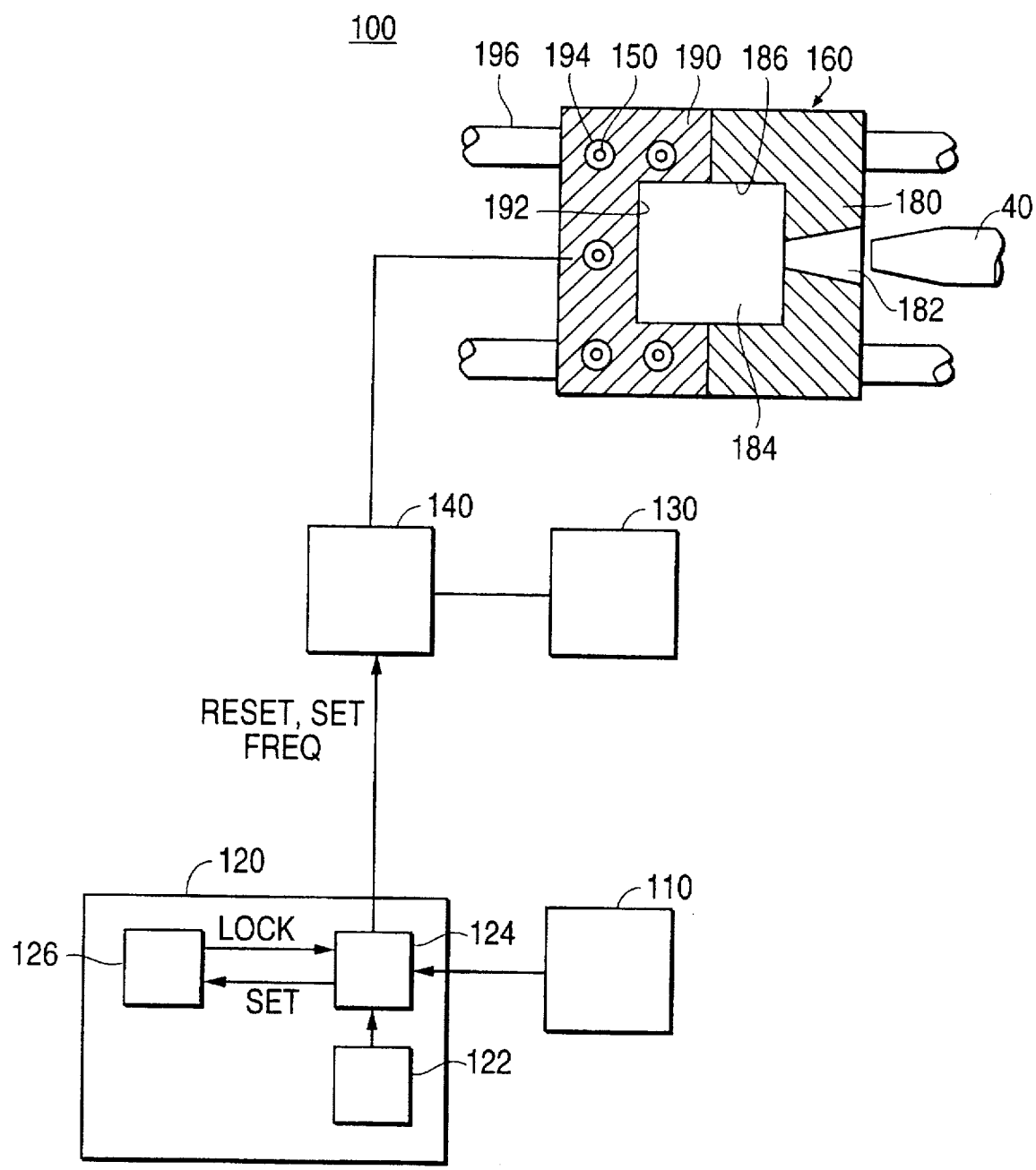

APPARATUS FOR HEATING A MOLD FOR AN INJECTION MOLDING SYSTEM

BACKGROUND OF THE INVENTION

1. Field of the Invention

The present invention relates to an apparatus for heating a mold for an injection molding system, and more particularly to a mold heating apparatus by means of high frequencies or microwaves.

2. Description of the Prior Art

An injection molding includes a plasticizing process for plasticizing (of a melting status) a material to be molded, and a flowing & filling process for permitting the plasticized molding material (hereinafter referred to as "resin fluid") to flow into and fill up a mold. One example of a method for precisely performing the injection molding upon such a thermoplastic mold product is disclosed in U.S. Pat. No. 5,376,317.

The flowing & filling process includes a pressurizing phase for flowing the resin fluid into the mold by means of a plunger, and a holding phase for maintaining the mold under a constant pressure until the resin fluid flowing to the interior of the mold is solidified. In the pressuring phase, the resin fluid flows into a cavity within the mold via an injection nozzle of an injection apparatus and an inlet of the mold.

The resin fluid flowing into the cavity during the flowing step is injected at a high pressure to induce a reaction force which exerts force upon the opposite direction of the flowing direction of the resin fluid. The reaction force possibly drives the resin fluid to flow in the opposite direction. Thus, it is required to block the backward flowing of the resin fluid which fills up the mold cavity by applying a supplementary pressure. Also, since the resin fluid has a decreased volume while being cooled, this decrease in volume of the resin fluid must be supplemented. The holding phase is for preventing the backward flowing of the resin fluid within the mold and supplementing the volume decrease resulting from the cooling. An insufficient holding phase produces a sink mark in the surface of a product and becomes an obstacle in obtaining a product with desired dimensions.

After carrying out the flowing & filling process, the mold is cooled (cooling phase), and a product with a desired shape and dimensions is completed via an ejecting phase in which the mold is opened along a parting line when the product is completely fabricated to eject the product from the mold.

During the above-stated flowing & filling process, if the temperature of the mold is lower than that of the molding material while the resin fluid flows toward the cavity, a leading edge of the flowing resin fluid is cooled to proceed with the solidification thereof. For this reason, the fluidity of the resin fluid is degraded, and the resin fluid cannot adequately fill up the cavity. The foregoing low temperature of the mold degenerates the luster of a product and presents noticeable flow marks and weld lines.

Therefore, when the temperature of the mold is so low that the fluidity of the resin fluid is degraded, an injection pressure must be increased for enhancing fluidity. However, the increase of the injection pressure causes a stress in the resin fluid because of the injection pressure. The stress remains within the resin fluid (residual stress) during the cooling and solidifying phases thereby causing deformation of the product.

Another approach for improving the fluidity of the resin fluid is to raise the temperature of the mold. The rise in the mold temperature inhibits the cooling of the flowing resin fluid to maintain the fluidity of the resin fluid, so that there is no need to increase the injection pressure.

A heat pipe installed within the mold is taken as an example of an apparatus for solving the above-mentioned problems without increasing the injection pressure. Here, prior to filling the resin fluid into the mold, the heat pipe is utilized to pre-heat the mold and continuously heat the mold while the resin fluid is filled. Consequently, the fluidity of the resin fluid can be improved even though the injection pressure is not increased. The mold equipped with the heat pipe is illustrated in FIG. 1.

FIG. 1 shows the conventional mold equipped with the conventional heat pipe. The conventional mold 10 for injection molding includes a fixed plate 20 formed with a sprue 22 into which the resin fluid is injected by means of an injection nozzle 40 of an injection apparatus (not shown), and a movable plate 30 for forming a cavity 24 therein by being coupled with fixed plate 20. In addition, a heat pipe 32 is contained in movable plate 30 for heating movable plate 30.

A heating coil 28 is accommodated around sprue 22 of fixed plate 20 to prevent the cooling of the resin fluid while the resin fluid is injected from injection nozzle 40 to fill up mold 10. Heating coil 28 preheats sprue 22 of fixed plate 20 before the resin fluid is filled and continues the heating operation while filling the resin fluid.

Heat pipe 32 contained into movable plate 30 heats movable plate 30, more specifically an inner wall 26 of cavity 24. Heat pipe 32 preheats sprue 22 prior to injecting resin fluid via sprue 22 and continuously heats inner wall 26 of cavity 24 of mold 10, thereby preventing the cooling of the resin fluid which flows into mold 10 via sprue 22.

A heated fluid flows within heat pipe 32. The heated fluid is heated by a fluid heater (not shown) provided to the outside of the mold and circulatively flows within heat pipe 32 by a pump (not shown). An oil is employed as the heated fluid.

The heated fluid flows within heat pipe 32 to heat movable plate 30, which then prevents the cooling of the resin fluid injected into cavity 24 of mold 10 due to a temperature difference between mold 10 and the resin fluid.

Upon the completion of injecting of the resin fluid by the injection apparatus, a series of phases including the holding phase for pressurizing the interior of mold 10 at a prescribed pressure, cooling phase and ejecting phase are carried out.

However, above-described conventional mold 10 is disadvantageous in that it cannot be sufficiently heated by heat pipe 32 since the temperature of the heated fluid flowing within heat pipe 32 is relatively low. Accordingly, insufficient heating of mold 10 cools the leading edge of the resin fluid to degrade the quality of the product as mentioned above.

A lot of time is required for heating mold 10 until reaching a temperature capable of preventing the cooling of the leading edge of the resin fluid. If the time for heating mold 10 is lengthened to raise the temperature thereof, then the molding cycle adversely extended.

Moreover, conventional mold 10 employing heat pipe 32 incurs problems such as short shot, sink mark, weld line, flow mark, poor luster and surface flaking (layer flaw). Consequently, when conventional mole 10 equipped with heat pipe 32 is utilized, a highly precise injection product cannot be fabricated.

FIGS. 2A and 2B are views showing a principle of induction heating. In FIG. 2A, a first circuit 50 has a first resistor R1, a first coil L1 and a power source V, and a second circuit 42 has a second coil L2 and a second resistor R2.

When a first electric current I1 flows to first resistor R1 and first coil L1 upon the power supply from power source V of first circuit 50, an induction electric current I2 is generated at second coil L2 of second circuit 42 which is a closed circuit to flow to second resistor R2. At this time, the temperature of second resistor R2 is raised by a resistance of second resistor R2.

Second circuit 42 of FIG. 2B is an equivalent circuit of FIG. 2A, in which second circuit 42 of FIG. 2A is equivalent to a heated subject 44. Here, power source V is electrically connected to an induction coil L1 winding around heated subject 44 via first resistor R1. Upon connecting power source V to induction coil L1, first electric current I1 begins to flow, and the temperature of heated subject 44 wound with induction coil L1 is heightened.

When utilizing the above-described induction heating, the time required for heating the mold up to a desired temperature is shortened as compared with using typical heat pipes.

SUMMARY OF THE INVENTION

Therefore, it is a first object of the present invention to provide an apparatus for heating a mold for an injection molding system equipped with a heating apparatus which can heat the mold up to a desired temperature within a short time by using induction heating to enable the fabrication of a highly precise injection product.

It is a second object of the present invention to provide an apparatus for heating a mold for an injection molding system equipped with a heating apparatus which can heat the mold up to a desired temperature within a short time by using dielectric heating to enable the fabrication of a highly precise injection product.

To achieve the first object of the present invention, the present invention provides an apparatus for heating a mold for an injection molding system, the apparatus comprising:

a controlling section for generating a heating start signal when receiving a filling signal from an injection controller for controlling an injection apparatus, and counting heating time to generate a heating reset signal when the heating time reaches a preset time;

a power supply for supplying an electric current of constant voltage;

a high frequency generator for receiving the heating start signal from the controlling section and being supplied with the electric current of constant voltage from the power supply to generate electric current having a predetermined high frequency; and a mold embedded with electric coils electrically connected to the high-frequency generator therein for being induction-heated by means of high frequency induction with the electric coil.

The controlling section generates the heating start signal by receiving the filling signal to turn on the high frequency generator. The high frequency generator is supplied with the electric current of constant voltage generates high-frequency electric current having a predetermined frequency. A mold embedded with electric coils is induction-heated up to the predetermined temperature within a short time by the high frequency coil through which the high-frequency electric current flows.

The above second object of the present invention is achieved by an apparatus which comprises:

a controlling section for generating a heating start signal when receiving a filling signal from an injection controller for controlling an injection apparatus, and counting heating time to generate a heating reset signal when the heating time reaches a preset time;

a microwave generator for receiving the heating start signal from the controlling section to generate microwave of a predetermined frequency; and a mold for being dielectric-heated by the microwave, wherein a waveguide is buried therein for migrating and dispersing the microwave from the microwave generator.

The mold is provided with composite layers therein, and the composite layers form a cavity for accepting a resin fluid. The composite layers are dielectric-heated up to the predetermined temperature with the short time by the microwave.

By utilizing the apparatus for heating the mold according to the present invention, the inner wall of the cavity can be sufficiently heated up to the desired temperature within the short time, and fluidity of the resin fluid filling up the cavity is increased. In addition to these, the luster of the product is enhanced while reducing flow marks, weld lines, etc.

BRIEF DESCRIPTION OF THE DRAWINGS

The above objects and other advantages of the present invention will become more apparent by describing in detail preferred embodiments thereof with reference to the attached drawings in which:

FIG. 1 is a view showing a conventional mold for an injection molding system;

FIGS. 2A and 2B are views for principally explaining the induction heating utilized in the present invention;

FIG. 3 is a view showing a construction of an apparatus for heating a mold for an injection molding system according to a first embodiment of the present invention.

DETAILED DESCRIPTION OF THE PREFERRED EMBODIMENTS

Figure 4:
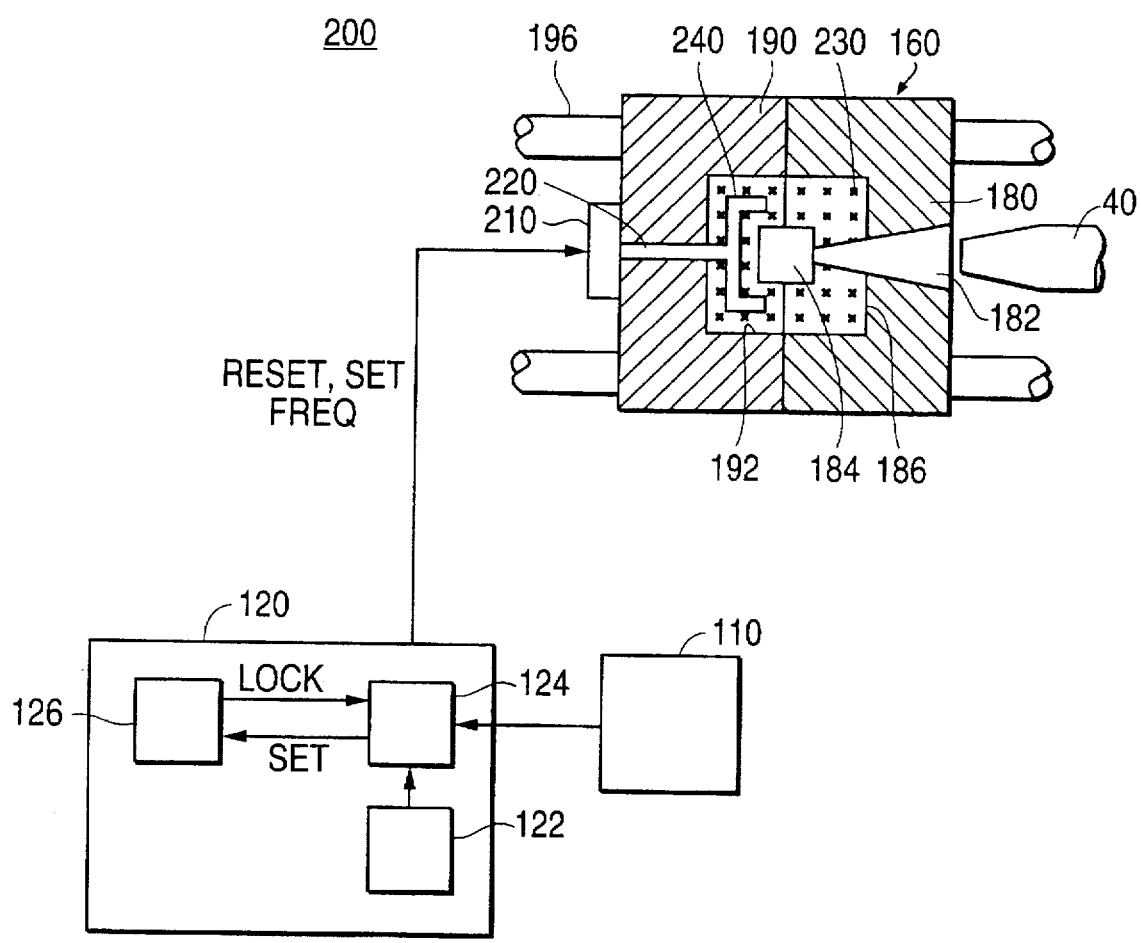
FIG. 4 is a view showing a construction of the apparatus for heating the mold for the injection molding system according to a second embodiment of the present invention.

Hereinbelow, preferred embodiments of the present invention will be described in detail with reference to accompanying drawings in which the same reference numerals represent the same elements.

Embodiment 1

A mold heating apparatus 100 according to the present embodiment utilizes induction heating. FIG. 3 is a view showing a construction of molding heating apparatus 100 according to a first embodiment of the present invention.

As shown in FIG. 3, mold heating apparatus 100 includes an injection controller 110 for controlling an injection apparatus (not shown) and generating a filling signal, and a controlling section 120 for receiving the filling signal of injection controller 110 to generate a heating start signal SET and, simultaneously, counting time to generate a heating reset signal RESET upon reaching a preset time THEAT. Additionally, a power supply 130 supplies electric current of constant voltage, and a high frequency generator 140 receives heating start signal SET to be turned on and is supplied with the electric current of constant voltage from power supply 130 to generate electric current having a predetermined high frequency. Also, mold heating apparatus 100 has an electric coil 150 electrically connected to high frequency generator 140, and a mold 160 embedded with electric coil 150 to be heated by electric coil 150.

Injection controller 110 generates the filling signal when the filling phase of injecting the plasticized resin fluid into mold 160 is initiated.

Controlling section 120 includes a keyboard 122 as a data input section for inputting data for the material to be molded, a micro-computer 124 for receiving the data to generate a frequency signal FREQ and for receiving the filling signal from injection controller 110 to generate heating start signal SET, and a counter 126 electrically connected to micro-computer 124 for counting the heating time.

A kind of the resin fluid and the heating time of mold 160 are inputted through keyboard 122. Micro-computer 124 receives the filling signal from injection controller 110 to generate heating start signal SET, and receives the data from keyboard 122 to generate frequency signal FREQ. Counter 126 is set by means of heating start signal SET and counts the heating time. If the heating time reaches preset time THEAT, counter 126 generates clock signal CLOCK. Micro-computer 124 generates heating reset signal RESET to be ready for counting the heating time again by receiving clock signal CLOCK.

Power supply 130 supplies the electric current of prescribed voltage to high frequency generator 140 under the control of controlling section 120, and adjusts the voltage to be able to change the heating temperature in view of the changed kind of the molding material.

High frequency generator 140 receives heating start signal ST of controlling section 120 to be turned on, and receives the low frequency electric current of constant voltage from power supply 130 to convert the low frequency electric current into a high frequency electric current. Also high frequency generator 140 receives frequency signal FREQ to adjust the frequency and generate high frequency electric current of adjusted frequency.

Electric coil 150 is electrically connected to high frequency generator 140 in the state of being embedded into mold 160 to let the high frequency electric current from high frequency generator 140 flow therethrough.

Mold 160 embedded with electric coil 150 is formed with a sprue 182 for accepting the resin fluid plasticized by the injection apparatus in one side thereof, and a fixed plate 180 which has a first groove 186 in the inner side. A burial hole 194 is formed for embedding electric coil 150, and an movable plate 190 is provided to mold 160 for being joined with fixed plate 180 to form a cavity 184 therein. Electric coil 150 is buried in the vicinity of a second groove 192 of movable plate 190.

Movable plate 190 is joined with/separated from fixed plate 180 by means of an externally-installed operating rod 196. Movable plate 190 is moved by operating rod 196 before the resin fluid fills up mold 160 by the control of injection controller 110. By doing so, movable plate 190 is joined with fixed plate 180 to form cavity 184, and the resin fluid fills into cavity 184 to manufacture a product of a predetermined shape.

Plurality of burial holes 194 are formed in the vicinity of second groove 192 of movable plate 190, and electric coil 150 is inserted into burial hole 194 and, in turn, electrically connected to high frequency generator 140.

Now, an operation of mold heating apparatus 100 according to the first embodiment of the present invention having the foregoing construction will be described below.

When movable plate 190 is moved by use of operating rod 196 to be joined with fixed plate 180 under the control of injection controller 119 injection controller 110 generates the filling signal.

Upon the generation of the filling signal, the injection apparatus moves an injection nozzle 40 to fixed plate 180 for injecting the resin fluid into mold 160 via sprue 182. At this time, micro-computer 124 generates heating start signal SET, and counter 126 is set to count the heating time.

High frequency generator 140 is turned on by heating start signal SET of micro-computer 124, and receives the low frequency electric current of prescribed voltage from power supply 130 to convert it into the high frequency electric current and provide the result.

Micro-computer 124 generates frequency signal FREQ when any changes of the kind of the resin fluid is occurred, that is, when the data for the resin fluid is inputted through keyboard 122. High frequency generator 140 receives frequency signal FREQ to change the frequency of the electric current, and generates high frequency electric current of changed frequency.

When high frequency electric current from high frequency generator 140 flows through electric coil 150, as shown in FIG. 2B, movable plate 190 embedded with electric coil 150 is heated by an induction phenomenon resulting from the interaction with electric coil 150. Thus, cavity 184 is heated to reach a predetermined temperature.

When heating time reaches preset time THEAT, that is, clock signal CLOCK is generated by counter 126, controlling section 120 generated heating reset signal RESET. High frequency generator 140 is then turned off by heating reset signal RESET, so that movable plate 190 is not further heated. Preset time THEAT corresponds to the time taken from the starting point to the ending point of filling the resin fluid, which is generally set to 10 to 15 seconds.

Embodiment 2

A mold housing apparatus 200 according to the present embodiment of the present invention utilizes dielectric heating. FIG. 4 is a view showing a construction of mold heating apparatus 200 according to the second embodiment of the present invention.

The dielectric heating refers to the method for using microwaves to heat a dielectric material without contacting it, which intends to activate the motion of the molecules within the dielectric material by implanting the microwave into the dielectric material with the consequence of heating an object, i.e., dielectric material, by a frictional force between the molecules. This method is utilized in microwave ovens, etc.

As shown in FIG. 4, mold heating apparatus 200 according to the second embodiment of the present invention includes an injection controller 110 for controlling the injection apparatus and generating a filling signal, and a controlling section 120 for receiving the filling signal of injection controller 110 to generate a heating start signal SET and, simultaneously, counting time to generate a heating reset signal RESET upon reaching a preset time THEAT. Additionally, a microwave generator 210 receives heating start signal SET from controlling section 120 to be turned on and generates predetermined microwaves, and a waveguide 220 induces migration of the microwave from microwave generator 210. Also, a mold 160 is joined/separated by means of injection controller 110 and embedded with waveguide 220 to be heated by the microwave from microwave generator 210.

Controlling section 120 includes a keyboard 122 for inputting data for the material to be molded, a micro-computer 124 for receiving the data to generate a frequency signal FREQ and for receiving the filling signal from injection controller 110 to generate heating start signal SET, and a counter 126 electrically connected to micro-computer 124 for counting the heating time.

A kind of the resin fluid and the heating time of mold 160 are inputted through keyboard 122. Mirco-computer 124 receives the filling signal from injection controller 110 to generate heating start signal SET, and receives the data from keyboard 122 to generate frequency signal FREQ. Counter 126 is set by means of heating start signal SET and counts the heating time. If the heating time reaches preset time THEAT, counter 126 generates clock signal CLOCK. Micro-computer 124 generates heating reset signal RESET to be ready for counting the heating time again by receiving clock signal CLOCK.

Mold 160 is formed with a fixed plate 180 for accepting the resin fluid by means of injection nozzle 40 and an movable plate 190 operated by operating rod 196. Fixed plate 180 and movable plate 190 are joined with each other to provide a cavity 184 in the inside of them. Fixed plate 180 is abutted with a first composite layer 230 for forming a half shape of cavity 184 therein, and has a sprue 182 penetrating from the outside to first composite layer 230 to be injected with the resin fluid. Movable plate 190 is embedded with waveguide 220 therein and abutted with a second composite layer 240 which forms cavity 184 in cooperation with first composite layer 230 when movable plate 190 is joined with fixed plate 180. Waveguide 220 is buried in second composite layer 240 such that it penetrates from the outside of movable plate 190 to second composite layer 240, thereby heating first and second composite layers 230 and 240 by the microwaves from microwave generator 210.

First and second composite layers 230 and 240 are the dielectrics being nonconductors of direct electric current, which use a glass fiber endurable against a high temperatures. The resin fluid filling up cavity 184 adopts a substance which is injection-molded at a relatively low temperature.

Injection controller 110 moves movable plate 190 toward fixed plate 180 to couple mold 160, and generate the filling signal when the filling phase for injecting the plasticized resin fluid into mold 160 is initiated.

By moving movable plate 190 by means of operating rod 196 to be joined with fixed plate 180, cavity 184 is provided within mold 160, the filling signal is generated from injection controller 110 and the resin fluid is to be injected into cavity 184 via sprue 182 by using injection nozzle 40.

At this time, controlling section 120 receives the filling signal from injection controller 110 to generate heating start signal SET and, simultaneously, counts the heating time. Once the heating time reaches preset time THEAT, controlling section 120 produces heating reset signal RESET.

Microwave generator 210 receives heating start signal SET of controlling section 120 to be turned on, and generates the microwave having the predetermined frequency to provide the result via waveguide 220.

Waveguide 220 consistently disperses the microwave from microwave generator 210 for heating first and second composite layers 230 and 240.

Movable plate 190 is joined with/separated from fixed plate 180 by means of externally-installed operating rod 196. Movable plate 190 is moved by operating rod 196 prior to filling the interior of mold 160 with the resin fluid under the control of injection controller 110 to be joined with fixed plate 180, thereby forming cavity 184. Then, the resin fluid fills up cavity 184 to fabricate the product of a predetermined shape.

Now, an operation of mold heating apparatus 200 according to the second embodiment of the present invention having the foregoing construction will be described below.

When movable plate 190 is moved by means of operating rod 196 to be joined with fixed plate 180 under the control of injection controller 110, injection controller 110 generates the filling signal.

Upon the generation of the filling signal, the injection apparatus moves an injection nozzle 40 to fixed plate 180 for injecting the resin fluid into mold 160 via sprue 182. At this time, micro-computer 124 generates heating start signal SET, and counter 126 is set to count heating time.

Microwave generator 210 receives heating start signal SET from micro-computer 124 to generate microwave with prescribed frequency.

Micro-computer 124 generates frequency signal FREQ when any changes of the kind of the resin fluid is occurred, that is, when the data for the resin fluid is inputted through keyboard 122. Microwave generator 210 receives frequency signal FREQ to change the frequency of the microwave ,and generates microwave with changed frequency.

Microwave generator 210 is turned on by heating start signal SET of controlling section 120 to generate a predetermined microwave, thereby providing the microwave via waveguide 220 buried into second composite layer 240.

Then, the microwave from microwave generator 210 migrates via waveguide 220 buried in second composite layer 240. By injecting microwave which migrates and disperses via waveguide 220 into first and second composite layers 230 and 240 while the resin fluid fills up cavity 184 by means of injection nozzle 40, first and second composite layers 230 and 240 forming cavity 184 within mold 160 are heated.

When heating time reaches preset time THEAT, that is, clock signal CLOCK is generated by counter 126, controlling section 120 generates heating reset signal RESET. Microwave generator 140 is then turned off by heating reset signal RESET, so that movable plate 190 is no longer heated. Preset time THEAT is the time taken from the starting point to the ending point of filling the resin fluid, which is generally set to 10 to 15 seconds.

As described in terms of the embodiments, the mold heating apparatus according to the present invention can sufficiently heat the inner wall of the cavity up to the desired temperature by means of the induction heating of high frequencies and dielectric heating of microwaves. As a result, the mold heating apparatus has the advantages of increasing the fluidity of the resin fluid filling in the interior of the cavity and enhancing the luster of the product while the flow mark and weld line are reduced.

Furthermore, by utilizing the mold heating apparatus according to the present invention, the mold can be heated up to the desired temperature within the short time period to be able to shorten the molding cycle.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for heating an injection molding system comprising:

an injection controller for controlling an injection apparatus and generating a filling signal;

a controlling section which generates a heating start signal upon receipt of said filling signal, counts a heating time, and generates a heat reset signal when said heating time is equal to a preset time having a range of 10 seconds to 15 seconds;

a microwave generator which generates a microwave of predetermined frequency upon receipt of said heating start signal and terminates generation of said microwave upon receipt of said heat reset signal;

a mold being dielectric-heated by said microwave and comprising a microwave guide tube for migrating and dispersing said microwaves, and a fixed plate having an injection aperture and defining a first half of a cavity, said first half of said cavity having an inner wall with a first composite layer of glass fiber abutted thereto; and a movable plate defining a second half of said cavity, said second half of said cavity having an inner wall with a second composite layer of glass fiber abutted thereto;

wherein said microwave guide tube extends through said second composite layer; and wherein said injection controller joins said movable plate with said fixed plate.

2. An apparatus for heating an injection molding system as claimed in claim 1, wherein said microwave guide tube is buried in said mold.

3. An apparatus for heating an injection molding system as claimed in claim 1, wherein said fixed plate and movable plate are dielectric-heated by the microwave from said microwave generator.

4. An apparatus for heating an injection molding system as claimed in claim 1, wherein said movable plate is movable to join with said fixed plate under control of said injection controller, thereby forming the cavity.

* * * * *